United States Patent [19]

Holly

[11] 3,806,989

[45] Apr. 30, 1974

[54] APPARATUS FOR SUPPLYING ADHERENT PLASTIC MATERIAL

[75] Inventor: James A. Holly, Richton Park, Ill.

[73] Assignee: Hollymatic Corporation, Park Forest, Ill.

[22] Filed: Apr. 14, 1972

[21] Appl. No.: 244,216

[52] U.S. Cl. .................................................. 17/32
[51] Int. Cl. ............................................. A22c 7/00
[58] Field of Search ................. 17/32; 425/251, 252

[56] References Cited
UNITED STATES PATENTS

| | | | |
|---|---|---|---|
| 3,588,948 | 6/1971 | Holly | 17/32 |
| 3,623,188 | 11/1969 | Holly | 17/32 |
| 3,153,809 | 10/1964 | Weien | 17/32 |
| 3,550,189 | 12/1970 | Lotz | 17/32 |
| 3,347,176 | 10/1967 | Hall | 17/32 X |

*Primary Examiner*—Louis G. Mancene
*Assistant Examiner*—D. L. Weinhold
*Attorney, Agent, or Firm*—Hofgren, Wegner, Allen, Stellman & McCord

[57] ABSTRACT

An apparatus for forming articles from a plastic material such as ground raw meat or other finely divided food material in which there is provided a large hopper for holding a supply of the material and a pressure chamber in which is located a pressure device for forcing the material into a mold for forming shaped articles such as raw meat patties under pressure. In one embodiment this pressure device is operated through repeated cycles each having a power portion for applying the pressure and a powerless portion during which the device is retracted preparatory to the next power portion and with the apparatus for moving the pressure device during the powerless portion of each cycle operating a feeder in the hopper for feeding the material into the pressure chamber. The disclosed apparatus also includes a conduit extending between an opening in the hopper and the pressure chamber and having a movable agitator in the conduit for dislodging the plastic material from the side walls of the conduit during operation of the apparatus.

15 Claims, 11 Drawing Figures

APPARATUS FOR SUPPLYING ADHERENT PLASTIC MATERIAL

BACKGROUND OF THE INVENTION

The invention relates to pressure molding apparatus for plastic material and particularly to apparatus for forming food portions such as meat patties from ground raw beef. Certain of this type of apparatus can receive only a relatively small amount of the plastic material at a time so that the operator of the device must replenish the supply at frequent intervals. The apparatus of this invention provides a large hopper which in one embodiment holds about 60 pounds of ground raw beef and the apparatus also includes feeder means for automatically feeding the plastic material even when it is adhesive such as ground raw beef into the pressure molding portion of the device automatically and continuously.

The best prior art of which applicant is aware are issued patents assigned to the same assignee as the present application. These are Patents Nos. 2,413,046, 2,491,179, 3,293,688, 3,319,285 and 3,457,587. Each of these discloses a type of agitator device but none discloses the invention disclosed and claimed herein.

DESCRIPTION OF THE PREFERRED EMBODIMENTS

The apparatus disclosed herein comprises a hopper 10 of large capacity such as about 60 pounds of ground raw beef mounted above and in communication with a molding apparatus 11 for molding patties of the material held in the hopper 10 such as the specific ground raw beef. The molding apparatus 11 is described and claimed per se in Pat. Nos. 3,417,425, 3,457,587, and 3,588,948, all assigned to the present assignee.

Figure 1:
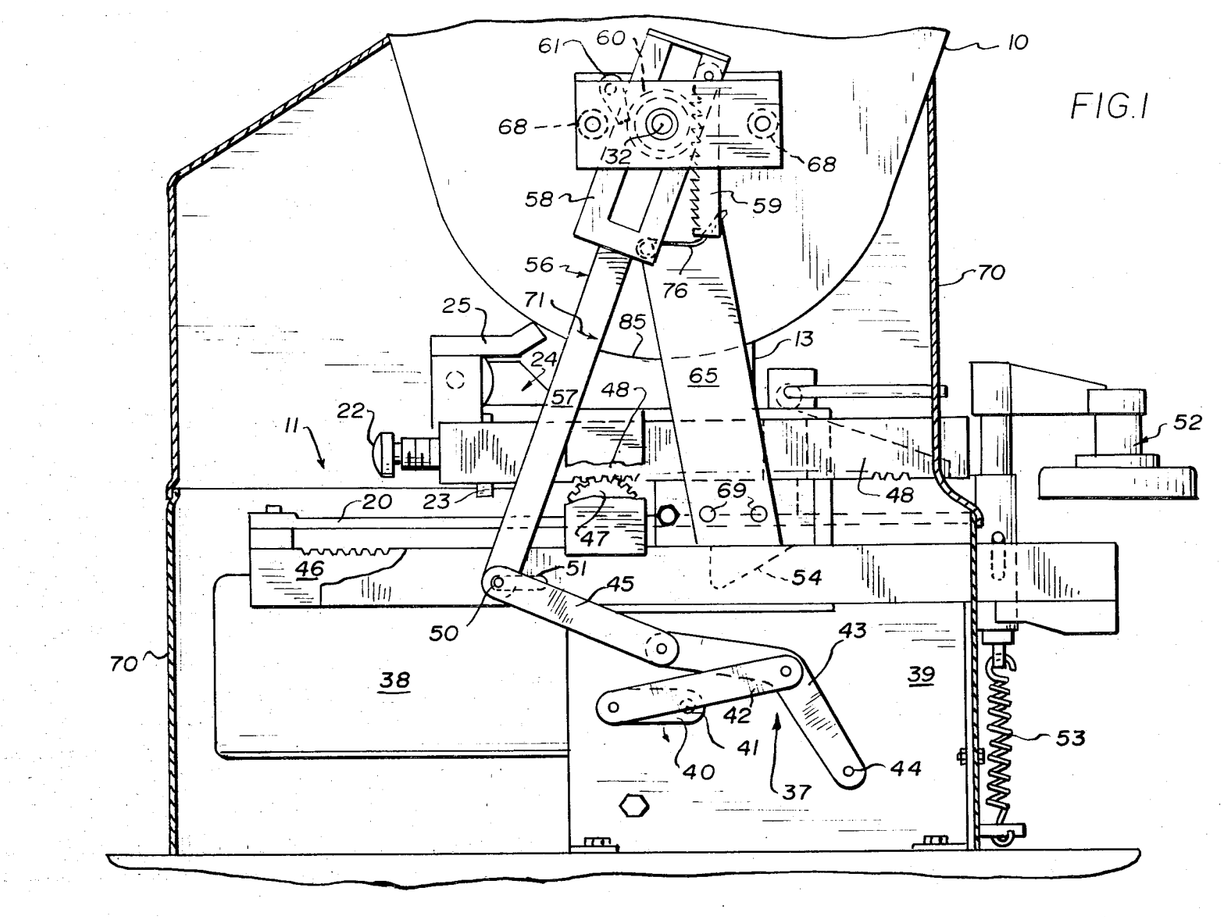
FIG. 1 is a fragmentary side elevational view partially in vertical section and partially broken away through an apparatus embodying the invention.
Figure 2:
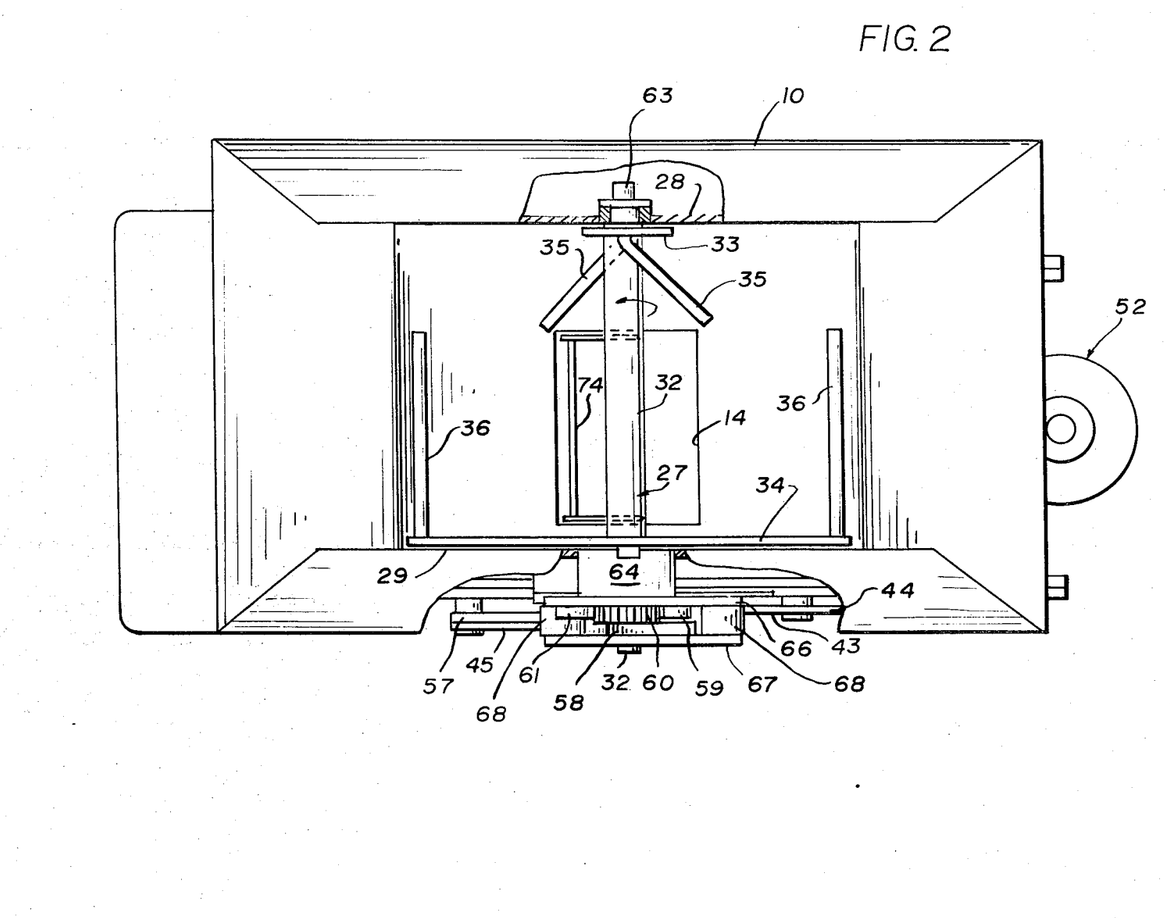
FIG. 2 is a plan view partially in section of the apparatus.
Figure 3:
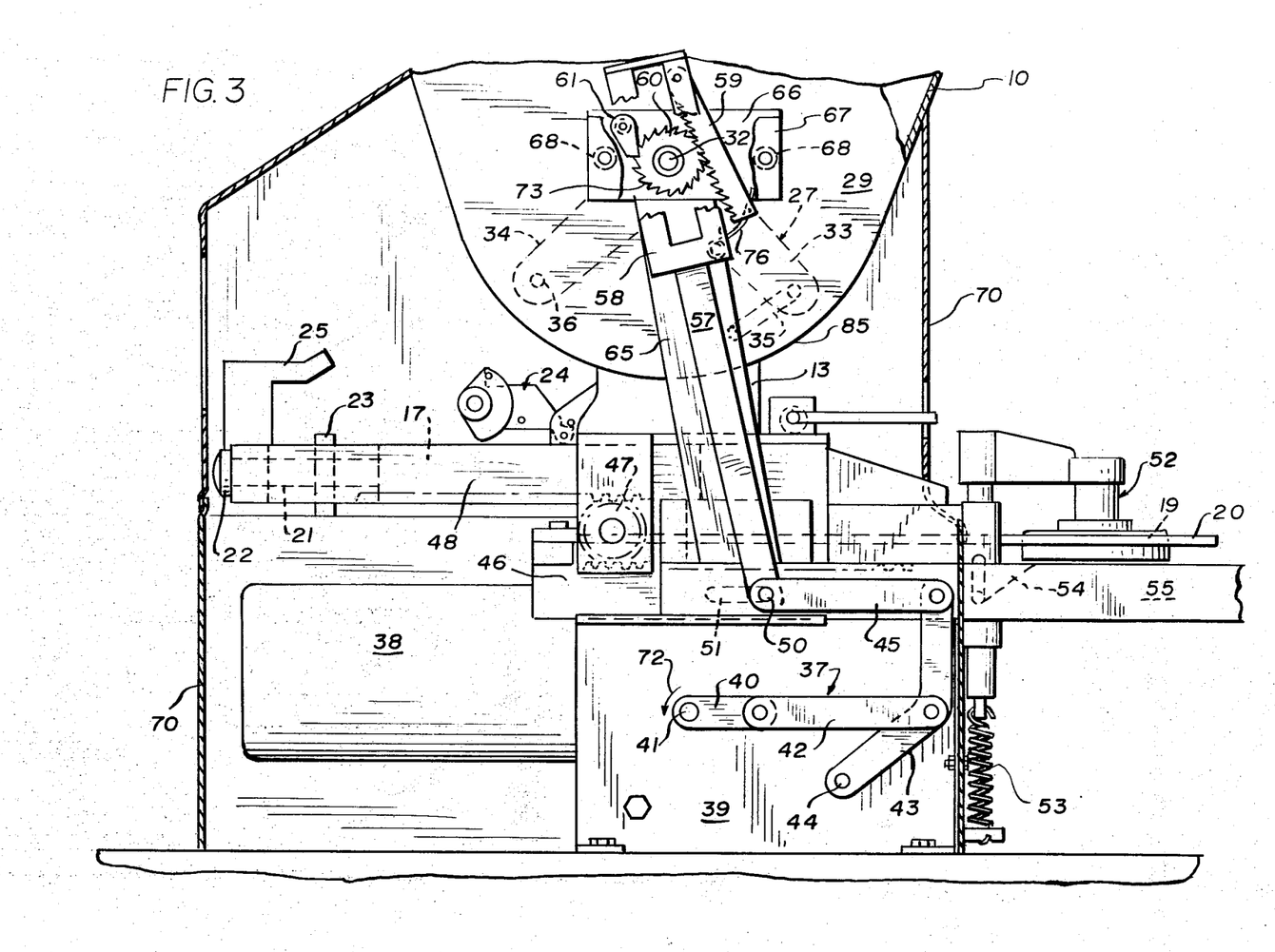
FIG. 3 is a view similar to FIG. 1 but showing the linkages at the opposite end of their movement.
Figure 4:
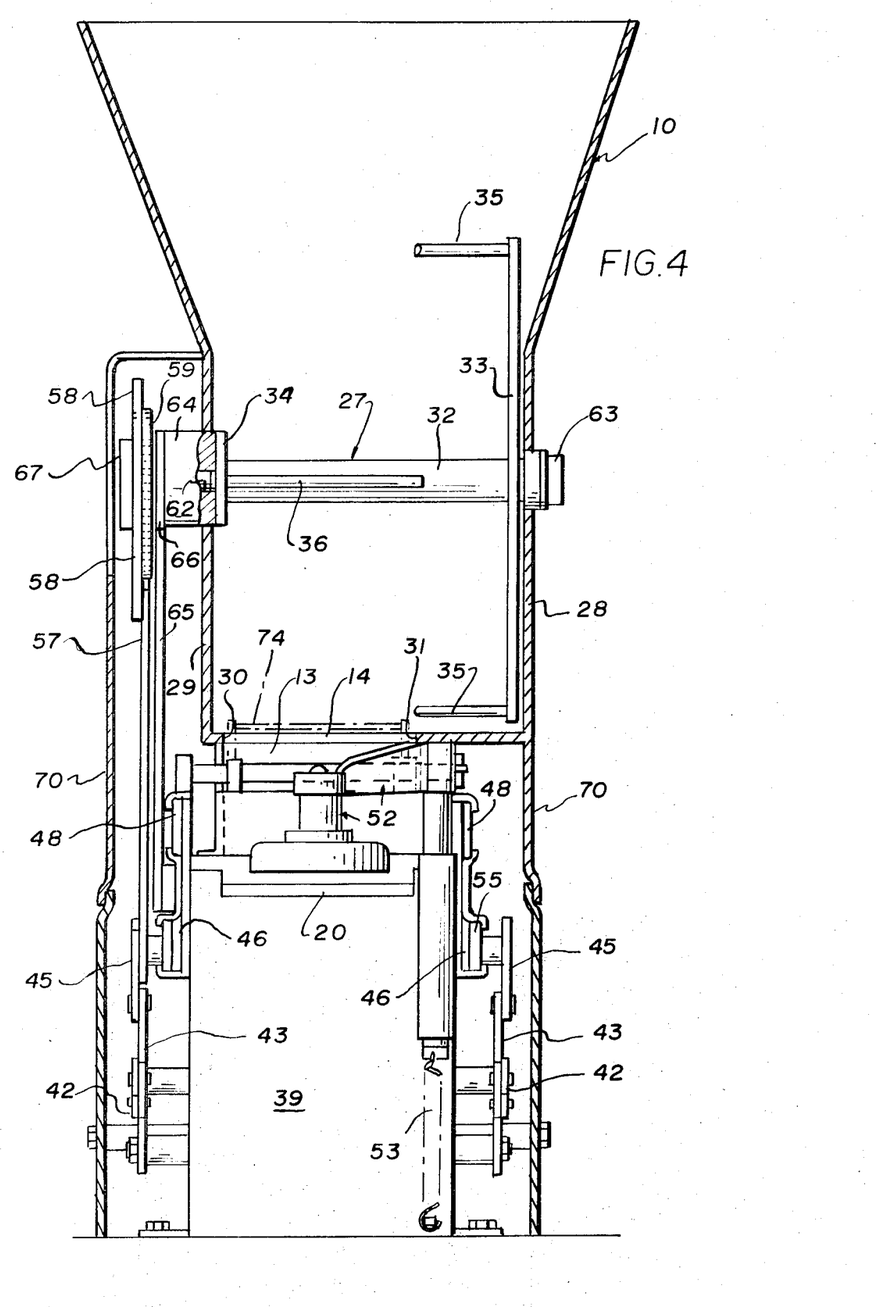
FIG. 4 is an end elevational view of the apparatus taken from the right end of FIG. 1 with portions in vertical section.

The apparatus of this invention includes a pressure chamber 12 (FIG. 5) located at the bottom and an access passage comprising a conduit 13 extending downwardly from the bottom of the hopper 10 (FIGS. 1, 3 and 4) and communicating with the bottom of the hopper through an access opening 14 (FIGS. 2 and 4). This conduit receives a supply 15 of the plastic material which is here ground raw beef from the hopper 10 and the pressure chamber 12 in the embodiment extends across the bottom of the conduit 13 and is bounded on the bottom by a top plate 16 on which is slidably supported a reciprocable feeder ram 17. This feeder ram functions as a pressure means in the pressure chamber 12 for forcing the material downwardly through a passage 18 into a patty shaped mold opening 19 in a reciprocable mold plate 20.

Figure 5:
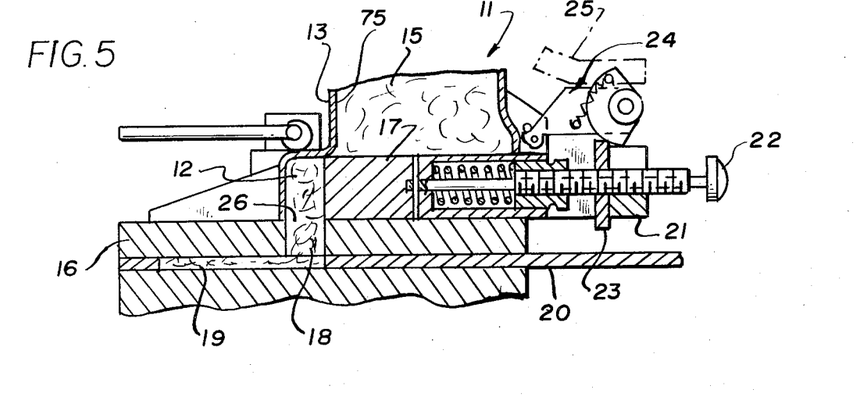
FIG. 5 is a partial vertical sectional view through the article forming portion of the apparatus.
Figure 6:
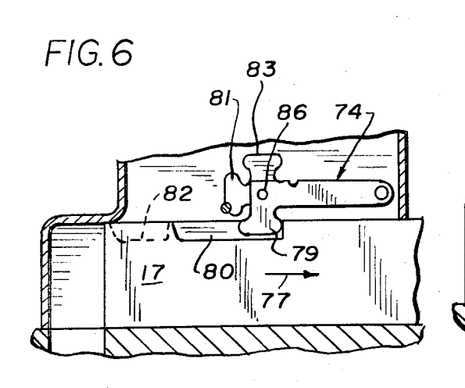
FIGS. 6 and 7 are fragmentary sectional views showing an agitator and operating ram.

The pressure means ram 17 is withdrawn to the right from the position shown in FIG. 4 by a cross bar 21 which operates against a button 22 in this withdrawing portion of the operating cycle of the ram 17 and which bears against an adjustable drive collar 23 in the power portion of the cycle on the movement from the retracted to the leftward position of FIG. 5.

In the illustrated embodiment the feeder ram 17 is held in its forwardmost position by a catch 24 which is held in this position by an overlying stop 25. The structure illustrated in FIG. 5 is disclosed in detail and claimed in the above Patent No. 3,588,948.

In the embodiment the mold plate 20 comprises article shaping means for receiving material from the pressure chamber 12 and shaping the articles which here are the succession of meat patties. The reciprocable feeder ram 17 comprises cyclical pressure means in the pressure chamber 12 operable through successive cycles which here is a back and forth movement of the ram 17 with each cycle having a power portion which is the movement from the extreme right of FIG. 5 to the forward position shown in FIG. 5 for forcing the material 26 into the article shaping means or mold opening 19 and a powerless portion during which movement of the ram 17 requires relatively little power. This powerless portion of the cycle as noted is a retracting movement from the position of FIG. 5 to the right thereof preparatory to another power portion of the cycle for applying pressure for forming the next patty.

In the hopper 10 there is located a feeder 27 with means mounting the feeder 27 for movement toward the access passage conduit 13 for urging the material in the hopper 10 into the pressure chamber 12 by way of opening 14 and conduit 13.

In the illustrated embodiment the hopper 10 has side walls 28 and 29 spaced apart adjacent the access passage opening 14 a distance considerably greater than the width of this passage as is shown in FIG. 4. One of these hopper sides 29 is adjacent one end 30 of the passage while the other hopper side 28 is spaced from the opposite end 31 of the passage opening 14. Thus the side walls 28 and 29 of the lower portion of the hopper are spaced apart a considerably greater distance than the width of the access passage.

The feeder 27 comprises a rotatable shaft 32 extending between the sides 28 and 29 of the hopper and has separate feeder sides 33 and 34 mounted thereon. The feeder sides 33 and 34 are adjacent the corresponding sides 28 and 29 of the hopper and each comprises a cross bar arranged at right angles to the shaft 32 and to each other.

Positioned on the ends of the bars 33 are feeder members in the form of a rod 35 at each end of the bar 33 and extending generally at right angles thereto toward the center of the hopper 10. The opposite feeder bar 34 also carries feeder members comprising a rod 36 at each end of the bar 34. These rods 36 are also at right angles to their bars 34 and both sets of rods 35 and 36 extend toward the center of the hopper as illustrated in FIG. 4. During rotation of the feeder 27 in the manner to be described hereinafter the rods 36 traverse the access opening 14 to urge material therethrough. The other set of rods 35 which are located to one side of the opening 14 urge the material toward the opening 14. In order to accomplish this the rods 35 are angled rearwardly relative to the direction of rotation as illustrated in FIG. 2.

In order to operate the feeder ram 17 through the successive cycles which as described includes a power portion where pressure is applied to the plastic material and a powerless portion during which the feeder is retracted the reciprocation is brought about by a linkage system 37 energized by an electric motor 38 through a gear reducer (not shown) within a bottom casing 39. This linkage system includes a link 40 rotated with a gear reducer shaft 41 in a counterclockwise direction as viewed in FIG. 1, a second link 42 attached to the first link 40, a third link 43 which is of bent construction hingedly mounted at its lower end 44 and attached to the end of the link 42 at about its midpoint and a fourth link 45 which is attached to the link 43 at the end opposite the pivot end 44.

As is explained in the above Patent No. 3,588,948 the reciprocation of the link 45 in each of the linkage systems 37 on opposite sides of the casing 39 reciprocates the pair of lower horizontal racks 46. Each of these racks 46 operating through a pinion 47 moves a corresponding upper horizontal rack 48. The pair of upper racks 48 reciprocates the cross bar 21 which extends between them and thus moves the feeder ram 17 through the power portion of its cycle or the movement from right to left to the position shown in FIG. 5 and through the powerless portion of the cycle which is from the position shown in FIG. 5 to the right thereof.

The reciprocation of the pair of lower racks 46 moves a horizontal mold plate 20 from the retracted position of FIG. 1 to the forward position of FIG. 3 for removal of the patty from the opening 19. The movement of each lower rack 46 is brought about by a pin 50 in the end of the fourth link 45 engaging a horizontal slot 51 in the lower rack 46. The patty is removed from the mold opening by a knockout device 52 which is lowered into the mold opening 19 as shown in FIG. 3 under the urging of a spring 53 and then raised therefrom by a cam 54 in a cam bar 55 on the right side of the machine as viewed in FIG. 4, all as described, illustrated and claimed in Patent No. 3,588,948.

The feeder 27 is operated in successive increments of a complete revolution by force transmitting means 56 that operably interconnect the pressure means which includes the linkage system 37 and the feeder during the powerless portions of the operating cycles for the feeder ram 17 and means are provided for inactivating this force transmitting means 56 during the power portions of the cycles which is the portion of movement of the feeder ram 17 from its extreme right position to the forward or left position of FIG. 5.

The force transmitting means 56 illustrated comprises an upwardly extending strap 57 with its lower end rotatably attached to the outer end of the fourth link 45. The upper end of this strap 57 has attached thereto a cross head 58 on the upper end of which and at one side is attached a depending rack 59. This hingedly connected depending rack 59 is adapted to engage a pinion 60 that is mounted on the shaft 32 for rotation therewith. The rack 59 is releasably urged into engagement with the pinion 60 by a spring 76 having one end attached to the bottom of the cross head 58 and the other end bearing upwardly against the bottom of the rack 59.

On the side of the pinion 60 opposite the rack 59 there is a hinged catch or dog 61 that is positioned to prevent a clockwise rotation of the pinion 60 and the shaft 32 as viewed in FIGS. 1 and 3.

The feeder 27 is releasably mounted within the hopper 10 by a threaded bolt 62 extending through the center of the shaft 32 of the feeder and with a bolt head 63 on the exterior of the hopper 10 on the side opposite the pinion 60. The extreme end of this bolt 62 that is opposite the head 63 engages and is held within an enlarged stub shaft 64. This stub shaft 64 serves as a mounting for one end of the thusly rotatable feeder 27 by being mounted on the upper end of the generally vertical but rearwardly inclined mounting strap 65 whose lower end is bolted to the apparatus as shown at 69.

The cross head 58, the rack 59, the pinion 60 and the catch 61 are all mounted between parallel horizontal plates 66 and 67 that are bolted together in spaced relationship with the spacing being provided by cylindrical spacers 68.

The mechanical linkages and the drive for the hopper feeder 27 are enclosed by a casing 70 that also serves with the mounting strap 65 as a support for the hopper 10 and the feeder 27.

The operation of the apparatus is as follows.

With the parts in the positions illustrated in FIGS. 1 and 5 a power portion of an operating cycle has just been completed with the ram 17 in its forwardmost position to force the plastic material 26 under pressure into the mold opening 19 and form a patty having the shape of this opening. From here the linkage system 37 moves to the right as illustrated by the arrow 71 of FIG. 1 which serves to retract the feeder ram 17 to the right from its position in FIG. 5 on the powerless portion of the cycle and to move the mold plate 20 to the right to the position of FIG. 3 where the knockout device 52 removes the patty from the opening 19. During this movement of the linkage system 37 the cross head 58 is similarly moved and this causes the rack 59 to be raised relative to the pinion 60 and rotate the pinion and thus the feeder 27 an increment of a complete revolution, here about 45°. This serves to move the feeder bars 33 and 34 and their rods 35 and 36 to push material through the opening 14 into position in front of the ram 17 preparatory to the next power portion of its operating cycle. It is obvious from what has been described heretofore that a cycle of operation of the ram 17 is a retraction movement to the right from the position of FIG. 5 which is a powerless portion of the cycle and a return to the position of FIG. 5 which is a power portion of the cycle.

The turning movement of the hopper feeder and the powerless portion of the ram cycle terminates with the operating parts in the position of FIG. 5. Then on further movement of the linkage in the direction indicated by the arrow 72 of FIG. 3 the strap 57 is moved to the left from the position of FIG. 3. This movement merely causes the hinged rack 59 to slide over the teeth of the pinion 60. Reverse rotation of the shaft 32 and feeder 27 is prevented by the catch 61 engaging the teeth 73 of the pinion 60 as illustrated in FIG. 3.

Figure 10:
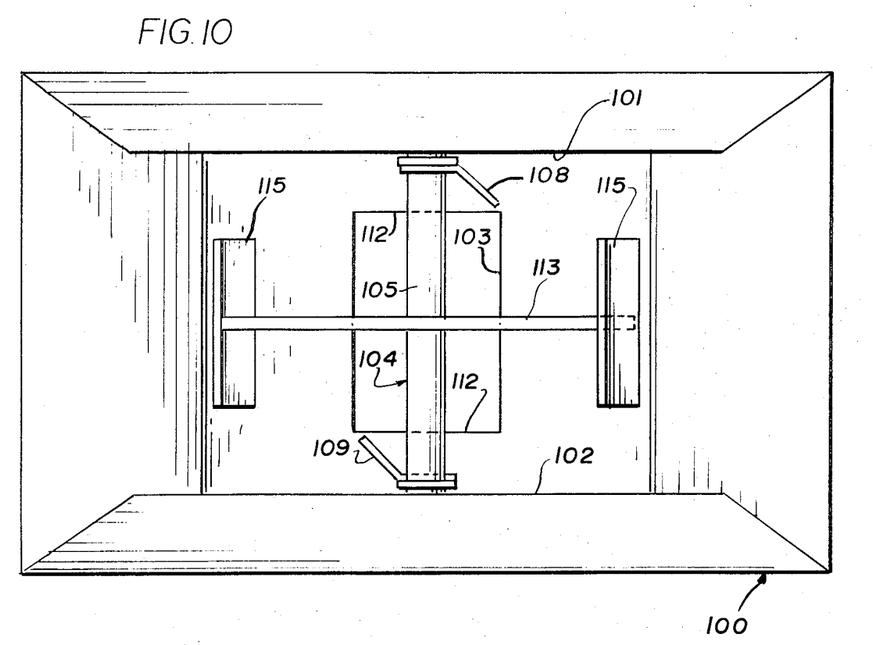
FIG. 10 is a plan view of the hopper of a second embodiment.
Figure 11:
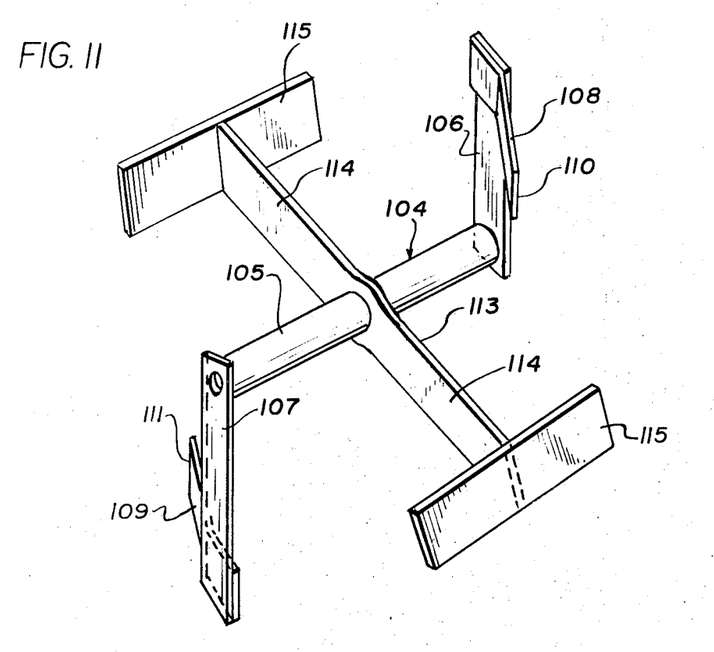
FIG. 11 is a perspective view of the feeder of the second embodiment.

FIGS. 10 and 11 illustrate a second embodiment of the invention. In this embodiment the hopper 100 has sides 101 and 102 spaced further apart than in the first embodiment. Midway between these sides is an access passage opening 103 serving the same purpose as the opening 14 in the first embodiment.

Positioned within the hopper 100 and between the side 101 and 102 is a feeder 104 for pushing the plastic material such as raw beef through the opening 103 in a manner somewhat similar to that of the feeder 27 of the first embodiment. As is shown in detail in FIG. 11 the feeder 104 comprises a transverse horizontal shaft 105 extending between the side walls of the hopper and having mounted on the opposite ends thereof side bars 106 and 107 that are substantially coplanar but extending in opposite directions. Each side bar 106 and 107 has attached at its end one end of a pusher blade 108 and 109, respectively, with each blade being angled in the direction of the opening 103 so as to urge material toward this opening. The ends 110 and 111 of the two blades are positioned so that they are just beyond the corresponding ends 112 of the opening 103 during movement of the feeder. The incremental rotation of the feeder 104 therefore urges the material in the hopper away from the side walls and in the direction of the opening 103.

In order to urge the material through the opening 103 there is provided at about the center of the shaft 105 a transverse bar 113 having a pair of opposite ends 114 with the extremities of each carrying a pusher blade 115 angled outwardly so that during the rotation of the feeder 104 the blades 115 push the material through the access passage opening 103 and into the conduit illustrated at 13 in the first embodiment.

The rotation of the feeder 104 in this second embodiment in increments is the same as has been previously described in connection with the first embodiment.

As is illustrated in FIGS. 6–9 the access passage conduit 13 also contains an agitator 74 for dislodging plastic material and particularly adhesive plastic material such as ground meat from the side walls 75 forming the conduit 13. This type of agitator and the operating means therefor are described and claimed in the above Patent No. 3,457,587. As is described there and illustrated herein the specific form of agitator is operated by engagement with the reciprocable pressure ram 17. During operation the agitator projects through the access passage opening 14 in the bottom of the hopper 10 to dislodge any plastic material that tends to bridge across this opening.

Figure 7:
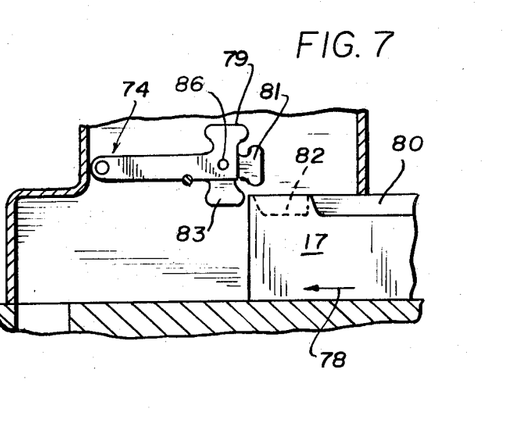
Figure 8:
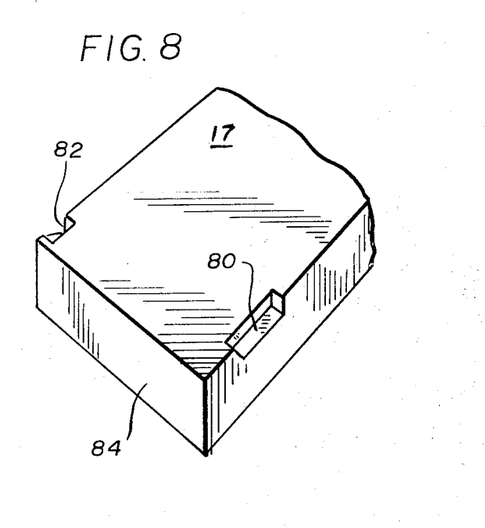
FIGS. 8 and 9 are perspective views illustrating the ram and the agitator.
Figure 9:
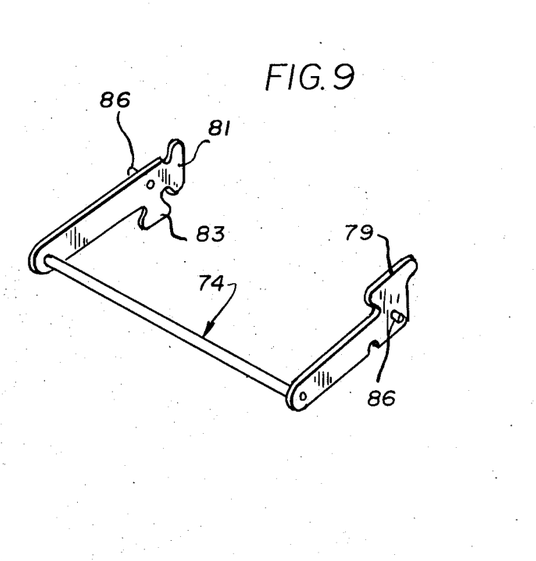

The agitator 74 which is not illustrated in FIG. 5 because of the detail of other elements is illustrated in FIGS. 6–9 inclusive. As is shown there, the agitator is operated by the ram 17 and rotated through 180° from the position shown in FIG. 6 to the position in FIG. 7 by the retraction or powerless movement of the ram 17 as indicated by the arrow 77 in FIG. 6. Then on the power stroke 78 of the ram 17 from the position of FIG. 7 to the position of FIG. 8 the agitator 74 is returned through 180° to the position of FIG. 6. In order to provide this movement the agitator includes a leg 79 that is engaged by a first cavity 80 on the rearward 77 movement of the ram 17. In order to continue the forward movement of the agitator 74 through a straight up position to the position shown in FIG. 7 the agitator is provided with a leg 81 that is engaged by a cavity 82 and by the time the ram 17 has reached its rearwardmost or retracted position as shown in FIG. 7 the leg 81 has left the cavity 82. On the return movement 78 of the ram 17 a leg 83 on the agitator is engaged by the forward surface 84 of the ram to reverse the movement of the agitator.

The bottom 85 of the hopper 10 is curved with an axis of curvature substantially coinciding with the axis of rotation of the feeder shaft 32. As can be seen from FIG. 3 the ends of the side bars 33 and 34 of the feeder 27 move closely adjacent to the inner surface of this bottom 85. The access opening 14 therefore to the supply conduit 14 is similarly curved. Because the arcuate movement of the agitator 74 is radially around its pivots 86 but from below while the arcuate movement of the feeder 27 is from above, any bridging over of the plastic material such as ground meat across the opening 14 will follow an upward opening curve while the dislodging movement of the agitator 74 will be a bottom opening curve. The result is that the removal of such bridged material is rapid, efficient and complete.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Apparatus for forming articles from a plastic material, comprising: a hopper for holding a supply of said material; a pressure chamber having access passage means from said hopper; article shaping means for receiving material from said pressure chamber and shaping said articles; cyclic pressure means in said pressure chamber operable through successive cycles each having a power portion for forcing said material into said article shaping means and a powerless portion during which substantially no forming pressure is applied to said material; a power device for operating said pressure means through said successive cycles; a feeder in said hopper; means mounting said feeder for substantial movement toward said access passage for urging said material in the hopper into said pressure chamber; force transmitting means for substantially operably interconnecting said pressure means and feeder during said powerless portions only of said cycles for said movement of the feeder; and means for substantially inactivating said force transmitting means during said power portions of said cycles, whereby said power device operates said feeder during said powerless portions.

2. The apparatus of claim 1 wherein said access passage means from said hopper comprises a conduit surrounding an opening in the bottom of the hopper leading to said pressure chamber.

3. The apparatus of claim 1 wherein said feeder comprises a rotatable shaft extending across said hopper and separate feeder sides mounted on said shaft for movement adjacent the sides of said hopper on rotation of said shaft.

4. The apparatus of claim 3 wherein said hopper comprises opposite sides between which said access passage is located and said feeder sides are located adjacent to said hopper side in the vicinity of said opening.

5. The apparatus of claim 4 wherein said hopper opposite sides are substantially parallel to each other at their bottoms that are adjacent to said opening and flare outwardly at the tops for increased capacity of the hopper.

6. The apparatus of claim 3 wherein said hopper sides are spaced apart in the region adjacent said access passage a distance considerably greater than the corresponding width of said passage, one of said hopper sides being adjacent an end of said passage.

7. The apparatus of claim 6 wherein one of said feeder sides that is adjacent said one hopper side carries first feeder members traversing said access passage and second feeder members on the other of said feeder sides urging said material toward said passage on said rotation.

8. The apparatus of claim 7 wherein said second feeder members are inclined rearwardly relative to the direction of movement thereof for said urging of the material.

9. The apparatus of claim 8 wherein said feeder sides comprise bars at right angles to said shaft and to each other and said feeder members comprise rods mounted on the ends of said bars and extending toward the center of said hopper.

10. Apparatus for forming articles from a plastic material, comprising: a hopper for holding a supply of said material; a pressure chamber having access passage means from said hopper; article shaping means for receiving material from said pressure chamber and shaping said articles; cyclic pressure means in said pressure chamber operable through successive cycles each having a power portion for forcing said material into said article shaping means and a powerless portion during which substantially no forming pressure is applied to said material; a power device for operating said pressure means through said successive cycles; a feeder in said hopper comprising a rotatable shaft extending across said hopper and separate feeder sides mounted on said shaft for movement adjacent the sides of said hopper on rotation of said shaft, each said feeder side comprising a side bar mounted on said shaft and an end blade thereon angled toward said access passage means; means mounting said feeder for substantial movement toward said access passage for urging said material in the hopper into said pressure chamber; force transmitting means for substantially operably interconnecting said pressure means and feeder during said powerless portions only of said cycles for said movement of the feeder; and means for substantially inactivating said force transmitting means during said power portions of said cycles whereby said power device operates said feeder during said powerless portions.

11. The apparatus of claim 10 wherein there is provided a pusher bar on said shaft having a pusher plate thereon traversing said access passage means on said movement of said feeder to force said material through the passage means.

12. The apparatus of claim 11 wherein said pusher bar is mounted on said shaft at the middle of the bar, and each end of said bar is provided with a said pusher plate.

13. The apparatus of claim 10 wherein said access passage means is located substantially midway between said sides of said hopper.

14. The apparatus of claim 13 wherein said hopper has a bottom in which is located said access passage means, and each said end blade traverses said bottom opposite an end passage means on said movement of the feeder.

15. The apparatus of claim 14 wherein there is provided a pusher bar on said shaft having a pusher plate thereon traversing said access passage means on said movement of said feeder to force said material through the passage means, said side bars extending at substantially right angles to said shaft and in opposite directions.

* * * * *